United States Patent [19]

Holmen

[11] 3,964,311

[45] June 22, 1976

[54] MEASURING APPARATUS

[75] Inventor: Hans Kristian Holmen, Sandvika, Norway

[73] Assignee: A/S Tele-Plan, Lysaker, Norway

[22] Filed: Jan. 24, 1975

[21] Appl. No.: 543,855

[30] Foreign Application Priority Data
Feb. 1, 1974 Norway.................................. 329/74

[52] U.S. Cl. ................................................ 73/295
[51] Int. Cl.² ......................................... G01F 23/22
[58] Field of Search ...................................... 73/295

[56] References Cited
UNITED STATES PATENTS

| | | | |
|---|---|---|---|
| 1,357,850 | 11/1920 | Derr.................................... | 73/295 |
| 2,279,043 | 5/1942 | Harrington........................... | 73/295 |
| 2,702,476 | 2/1955 | De Boisblanc....................... | 73/295 |
| 3,280,627 | 10/1966 | Cousins et al. ...................... | 73/295 |

Primary Examiner—James J. Gill
Assistant Examiner—Anthony V. Ciarlante
Attorney, Agent, or Firm—Ladas, Parry, Von Gehr, Goldsmith & Deschamps

[57] ABSTRACT

Measuring apparatus for determination of the level of a boundary layer between oil and water in a tank, comprising electrical sensing units distributed vertically in the tank and adapted to be responsive to the liquid and to deliver measuring signals to electrical measuring circuits with associated display devices for indicating and possibly recording the level. The sensing unit comprises thermo-couples each having a measuring junction part mounted in good thermal contact with a body of a material having good heat conducting properties, which body is adapted to be in good thermal contact with the surrounding liquid, and an electrical heating resistor being also in good thermal contact with the body and adapted to be supplied with a suitable electrical current. The reference junction part of the thermo-couple is arranged in good thermal contact with the surrounding liquid and has such a vertical distance from the measuring junction part that any significant heat from the body cannot be transferred through the liquid or in any other way to the reference junction part, said vertical distance being not so great that vertical temperature variations in the liquid influence the measurement. The signal from each individual sensing unit is fed separately to the electrical measuring circuits.

12 Claims, 7 Drawing Figures

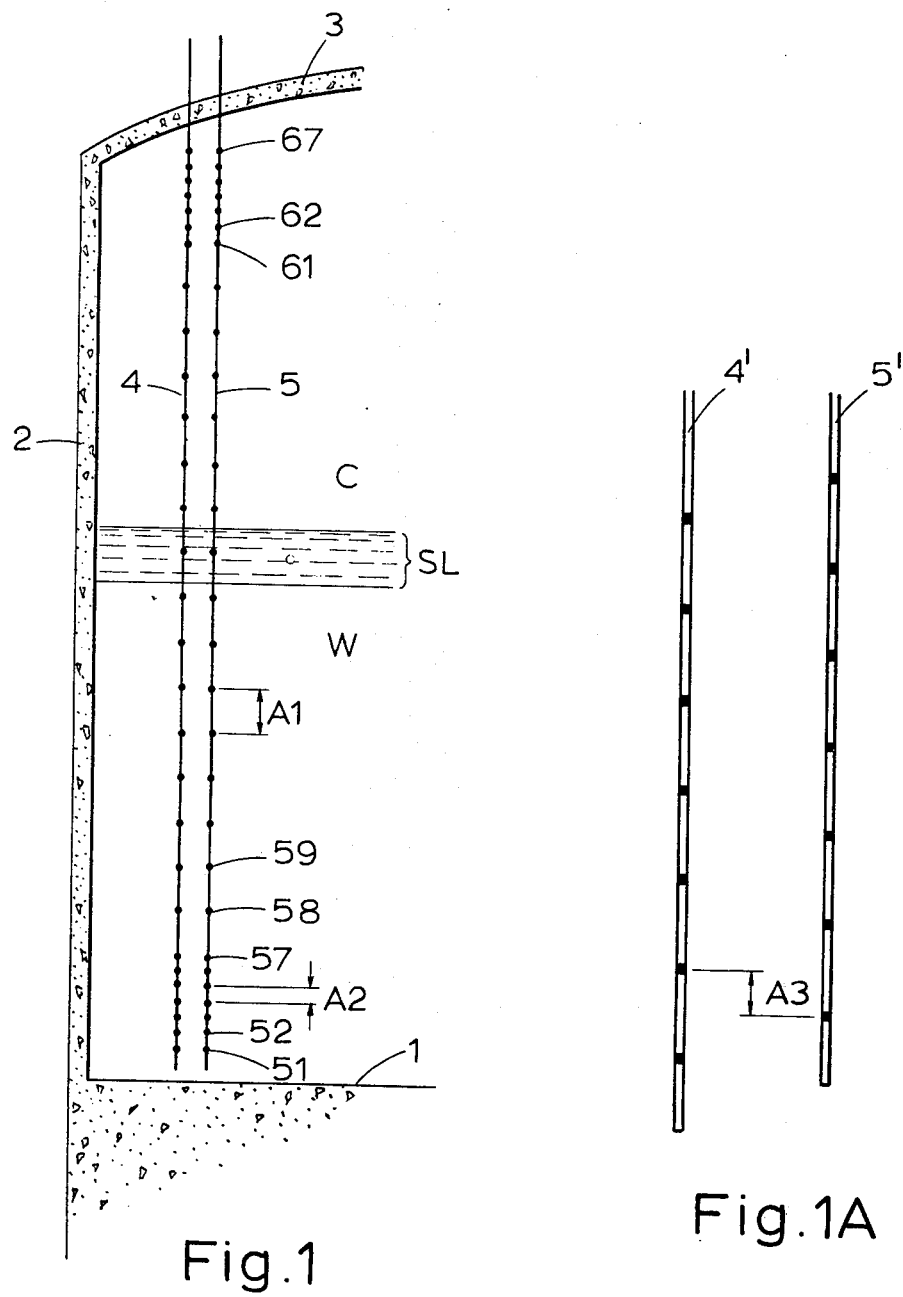

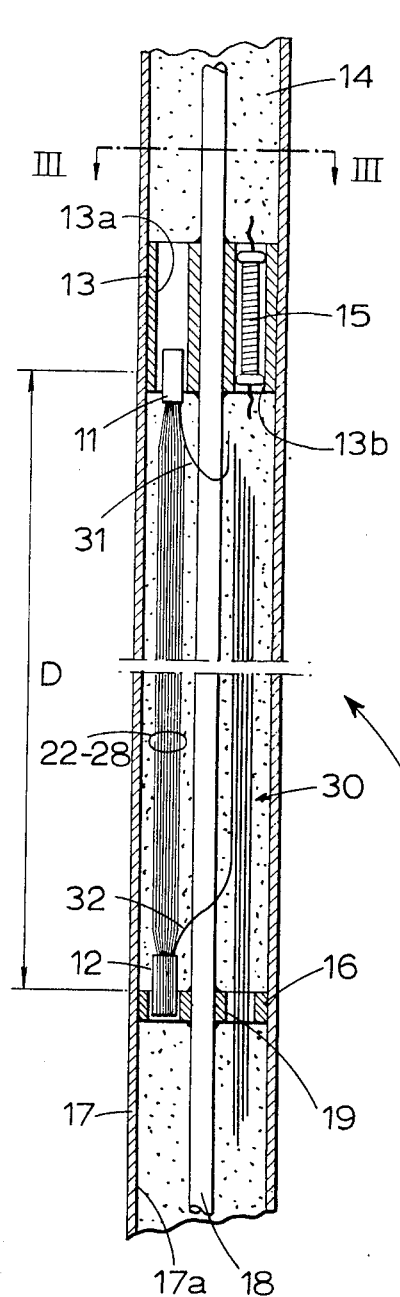
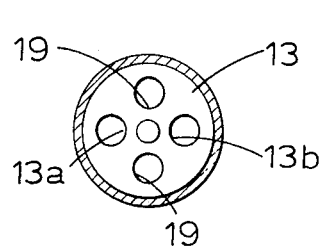
Fig. 3
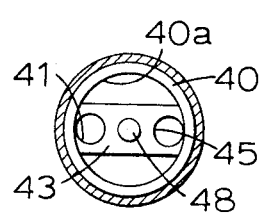
Fig. 4
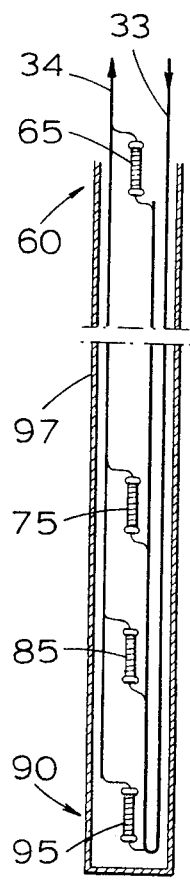
Fig. 6
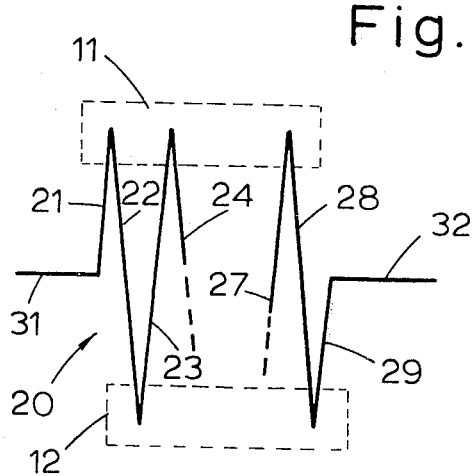
Fig. 2
Fig. 5

MEASURING APPARATUS

This invention generally relates to measuring apparatus for determination of the level of a boundary layer or face between two different liquids, in particular oil and water. More specifically, the invention is directed to such measuring apparatus to be used in large storage tanks for crude oil at an offshore production location, where tanks employed are of the type which contain both sea water and oil, the oil being stored above the water in the tank and an increase of the amount of oil pressing the water out of the tank. Determination of the amount of oil in the tank accordingly involves the determination of the boundary layer or face between oil and water.

With the above specific utilization of the invention it is, moreover, remarked that the boundary layer between oil and water according to the circumstances can have the form of a rather thick layer with a gradual transition between a concentration of 100% water and a concentration of 100% oil. It is assumed that this transition layer can be as thick as 2-3 meters in very large tanks after some time of operation.

The specific utilization at which the invention is primarily directed, place very strict requirements on the operational reliability, life-time and ruggedness of the measuring apparatus. The tanks concerned have such dimensions and are used under such conditions that replacement or maintenance operations on the measuring equipment in the tanks are very difficult or almost excluded.

For measuring the liquid level in tanks there are previously known a large number of different solutions, among others solutions being based on bubble tubes or float bodies. Also known are solutions being purely electrical and therefore functioning without moving parts in contact with the liquid or without flowing auxiliary media. Such known solutions, however, are in part complicated and expensive when used in large tank plants and are in part not sufficiently robust for use under the particularly difficult conditions for which the present invention is intended.

This invention is based on the principle of taking advantage of the difference in thermal properties of the various fluids in question, in the first place the specific heat thereof. With the particular arrangement and function of the measuring apparatus according to the invention as stated in the following description and claims, substantial advantages are obtained in the field of application concerned, by employing the above principle. The apparatus is simple in structure and has no moving parts whatsoever. All active components in the apparatus are well protected against the surrounding fluids. The measurement is effected in discreet steps which can be adjusted so as to obtain great exactness in those ranges or portions where this is necessary. When used in oil/water tanks of the offshore type both the oil level or amount as well as the thickness of the transition layer between oil and water are determined. Moreover, the measuring apparatus can be used for measuring the water level in the tank sections during towing of the tank equipment to the production location.

The invention essentially relates to that part of the measuring system which is located in the tanks, as electrical measuring circuits and display devices of various conventional types can be used in association with the measuring apparatus contemplated here. For example the display of the measuring results can take place by means of lamp panels in which there is provided one or two lamps for each of the discreet measuring points.

Thus, more specifically, the invention relates to measuring apparatus of the type comprising electrical sensing units distributed vertically in the tank and adapted to be responsive to the liquid and to deliver measuring signals to electrical measuring circuits with associated display devices for indicating and possibly recording the level, said sensing unit comprising thermo-couples each having a measuring junction part mounted in good thermal contact with a body of a material having good heat conducting properties, which body is adapted to be in good thermal contact with the surrounding liquid, and an electrical heating resistor being also in good thermal contact with the body and adapted to be supplied with a suitable electrical current. The features being characteristic to the apparatus according to this invention primarily consist therein that the reference junction part of the thermo-couple is arranged in good thermal contact with the surrounding liquid and has such a vertical distance from the measuring junction part that any significant heat from the body cannot be transferred through the liquid or in any other way to the reference junction part, said vertical distance being not larger than leaving temperature variations vertically in the liquid without influence on the measurement, and that the signal from each individual sensing unit is fed separately to the electrical measuring circuits.

In the following description the invention shall be explained more in detail with reference to the drawing, in which:

FIG. 1 shows a schematic vertical section through a tank provided with measuring apparatus according to the invention.

FIG. 1a shows a fractional view of the arrangement in FIG. 1 as a somewhat modified embodiment.

FIG. 2 shows enlarged and in axial section a sensing unit in the apparatus according to the invention.

FIG. 3 shows a cross-section along lines III—III in FIG. 2.

FIG. shows another embodiment as an alternative to what is shown in FIG. 3.

FIG. 5 shows schematically the electrical structure of thermo-couples included in the sensing unit in FIG. 2.

FIG. 6 shows a particular circuit for supplying electrical current to heating resistors included in the measuring apparatus according to the invention.

In FIG. 1 there is shown a general and simplified view of the arrangement of measuring apparatus according to the invention in a large oil tank consisting of a bottom 1, side-walls 2 and roof 3 made of concrete. The lower part of the tank contains water W, and the upper part oil C. Between these there is shown a transition layer SL having a gradually changing concentration of oil and water. This layer is established under certain conditions among others as a result of the presence of micro-organisms.

In the tank shown in FIG. 1 there are provided two tubes 4 and 5 extending through the roof 3, in which tubes there are mounted sensing units in certain positions, sensing units 51 to 59 and 61 to 67 being indicated on the tube 5. Along the major portion of the measuring range of interest the sensing units have a constant mutual spacing Al which is comparatively large, for instance 1.5 m, whereas this mutual spacing between the units is reduced at the upper and the lower end portion, where it is more necessary to have an exact indication or recording of the level. For example, the mutual distance between the respective sensing units 51 to 57 or 61 to 67, at the lower and upper end portion can be 0.5 m in large storage tanks for crude oil at the offshore production location. With the spacings indicated here it will also to a certain degree be possible to measure the thickness of transition layer SL.

When two measuring tubes 4 and 5 have been shown in the embodiment of FIG. 1, this is due to the desire of having a 100% reserve in the case of failure or damage caused for some reason or other in one of the measuring tubes. These two measuring tubes 4 and 5 can also normally be in operation simultaneously or in parallel. However, when mounting two such parallel measuring tubes it will be possible to obtain a specific advantage as illustrated in FIG. 1a. As shown in this figure, the measuring tubes 4' and 5' are mutually displaced in the longitudinal direction by an amount A3 equal to half of the mutual spacing between the sensing units in the lowermost portion of the tubes. In this way it is possible to obtain a further fine sub-division of the measuring range near the bottom and possibly also near the top of the tank.

A single sensing unit 10 is shown in more detail in FIG. 2. Encapsulated in a tube 17 of heat conducting and mechanically strong material, for instance stainless steel, there are provided thermo-couples with a measuring junction part 11 and a reference junction part 12, a heating resistor 15, a first heat conducting body 13 and a second heat conducting body 16 as well as a support rod 18 serving to retain the various components of the sensing unit in a desired position. The measuring junction part 11 containing the metal junction points or weld points which are intended to be subjected to the higher temperature, is mounted in a bore 13a in the body 13, whereas the reference junction part 12 of the thermo-couples is mounted in a corresponding way in the second body 16. Both bodies 13 and 16 are cylindrical and have a central hole for the rod 18. The attachment to the rod can be effected by brazing. The cylindrical outer walls of the two bodies engage closely to the inner tube wall wheel and the shaft in order that the bodies get a good thermal contact with the tube 17. The heating resistor 15 is located in a bore 13b in the first body 13 and is adapted to be supplied with electrical current by means of wires extending through the tube 17.

In an installation with a number of such sensing units in a common tube 17 the sensing units are mounted on the rod 18 at the desired mutual spacing and are then introduced into the tube together with the necessary electrical wiring. Thereafter the whole tube is filled with a moulding compound 14 which is electrically and thermally insulating. This provides a particularly good protection and stabilization of all parts and components in the apparatus so that even damage to the tube 17 can be made without influencing the operation of the measuring apparatus. The moulding compound 14 preferably is of the epoxy type and is adjusted to have a certain shape resiliency in solid condition at the same time as it is incompressible.

The function of each sensing unit is based on the fact that the first body 13 is heated by the heating resistor 15 and the measuring junction part 11 senses the resulting temperature of the body 13. This resulting temperature depends upon the heat dissipation to the surrounding fluid and is therefore influenced by the thermal characteristics thereof, in particular its specific heat. The reference junction part 12 of the thermo-couples is situated at a certain distance D from the measuring junction part 11 so that the heat influence from the body 13 on the reference junction part 12 is neglectable. Through the body 16 and the tube 17 the reference junction part 12 is in good thermal contact with the surrounding fluid, which with the chosen distance from the body 13 cannot contribute with any noticeable heat transport from the body 13 to the reference junction part 12. This part accordingly will sense a temperature corresponding to the temperature of the surrounding fluid.

During with crude oil and sea water from a production location in the North Sea it has been found that the thermo-couples in measuring apparatus according to the invention produce measuring signals for these respective liquids, being proportional to the specific heat thereof, i.e., at a ratio of about 1:2. When measuring the combination water-air the difference is larger.

FIG. 3 shows a cross-section through the body 13 with bores 13a and 13b, as mentioned above, and besides bores 19 for passing wires through the tube. A corresponding bore 19 is also shown in FIG. 2 in the second body 16. A suitable material for these bodies is copper. Among others because of the fact means. it is difficult to work copper, these bodies can advantageously have a shape as shown in FIG. 4, in which the body 40 has the shape of a cylindrical sleeve at the inner wall 40a of which a thermo-couple measuring junction part 41 and a heating resistor 45 can be mounted by means of a cross-member 43 having a central hole 48 for the support rod. This embodiment apparently will be cheaper both with respect to material and machining. Besides, it becomes unnecessary to perform additional maching operations for providing passages for wires through the tube. In the embodiment shown in FIG. 3 the passage holes 19 can of course be in the form of recesses from the circumference of the body.

FIG. 5 schematically shows the electrical circuit for the thermo-couples. There is employed a series connection of elements consisting of copper conductors 21, 23 . . . 27, 29 and constantan conductors 22, 24 . . . 28 cooperating with the respective copper conductors, forming the measuring junction part 11 and the reference junction part 12 respectively, of the thermo-couple group. Lead conductors 31 and 32 for transferring signals from the thermo-couples are also copper conductors, since the conventionally employed compensation cable can be eliminated in the arrangement described here. The metal conductors 22–28 forming the thermo-couples also provide for the connections between the measuring junction part 11 and the reference junction part 12 so that separate connection wires between these parts are not required. In practice the copper and constantan conductors are used in the form of thin, insulated wires.

By connecting a large number of thermo-couples in series as described above, there is generated a sufficiently strong output signal. It is possible to eliminate differences in the measuring signal caused by unequal distances from the control room, temperature variations, etc., by utilizing the generally known voltage compensation principle in the measurement.

In measuring apparatus in which the measuring tube contains a plurality of sensing units, it is an advantage to take special precautions for feeding all heating resistors with exactly the same and constant current. In FIG. 6 there is shown an arrangement of supply wires for eliminating differences which can be due to unequal distances between the control room including the measuring circuits and the supply circuits respectively, and the heating resistors. In FIG. 6 there is shown an example with four sensing units 60 to 90 with associated heating resistors 65, 75, 85 and 95 respectively. These are according to the above description regularly spaced along the interior of a protective tube 97. The heating resistors 65 to 95 being preferably in the form of wire-wound resistors, are for evident reasons connected in parallel between supply conductors 33 and 34. What is specific in the arrangement of FIG. 6, is that one of these conductors, i.e., the conductor 33, extends directly down to the lowermost sensing unit 19 and has there its first connection to the heating resistor 95. Then the conductor 33 is passed upwardly in the tube and has connection to the remaining resistors 85, 75 and 65 in the order recited. The supply conductor 34 is connected in succession from above first to the uppermost heating resistor 65 and thereafter to the resistors 75, 85 and 95 in succession. With this form of current supply the difference in distance from the respective heating resistors to the source of current will be eliminated, whereby the current supply can be made more identical at the various resistors.

Since, as mentioned, the measuring apparatus and the associated protective or enclosing tubes can be installed in tanks having very large dimensions, it may be necessary to assemble the tubes from sections being joined at the location of the installation.

For mounting the assembled tube sections in a tank, for instance in an arrangement as shown in FIG. 1, there may be used conventional clamp devices which are not shown in the drawings. During installation due consideration must be taken in order that the measuring tubes are not located in such portions of the tank that they are subjected to much turbulence or similar disturbances in the liquids of which the level is to be measured. At the top of the tank the measuring tubes can be associated with a lead-through box in which the wires from the tubes are connected to a cable for transferring signals to and supplying current from the control room. As explained above, this cable must contain a wire for each sensing unit in the apparatus. As an additional protection against possible failure and damage because of defective insulation or shortcircuiting in the heating resistors, there may be provided fuse elements for these resistors separately or in groups.

In addition to the display devices with lamps mentioned in the introduction to this description, there may of course be employed other forms of display, for instance with pointer instruments. With continuous feeding of electrical current to the heating resistors the measuring apparatus described here will involve a form of memory effect, as the measuring signal is available from all measuring points, i.e., from all sensing units, at any time. Instead of a system based on the stationary condition at each sensing unit during such constant feeding and heating, there may also be employed a measuring method based on the difference in step response by switching on the current supply from an initial condition with unheated resistors.

It is obvious that the measuring apparatus can be connected to switches, controls, etc., for utilizing a common measuring equipment in the control room for measuring apparatus in different tanks and also that there may be provided alarm devices for acoustic or visual warning when certain predetermined levels are exceeded.

I claim:

1. Measuring apparatus a determination of the level of a boundary layer between oil and water in a tank, comprising a plurality of electrical sensing units distributed vertically in the tank and adapted to be responsive to the liquid and to deliver measuring signals to electrical measuring circuits with associated display devices for indicating and possibly recording the level, each sensing unit comprising: station
    a. a body having good heat conducting properties and adapted to be in good thermal contact with the surrounding liquid;
    b. an electrical heating resistor in good thermal contact with said body and adapted to be supplied with an electrical current; and
    c. a plurality of thermo-couples connected in series, each thermo-couple having a measuring junction part in good thermal contact with said body and a reference junction part in good thermal contact with the surrounding liquid, the reference junction parts being spaced vertically from the measuring junction parts so that no significant heat transfer can take place from said body to the reference junction parts, the vertical distance between the reference junction parts and said body being not so great that vertical temperature variations in the liquid influence the measurement, and the apparatus also comprising a plurality of separate electrical connection means for feeding signals from the sensing units respectively to the electrical measuring circuits.

2. Apparatus according to claim 1, characterized in that one of the two metals in the thermo-couples is copper and that the signal wire from each sensing unit has conventional copper conductors.

3. Apparatus according to claim 1, characterized in that the vertical distance is at least four times the outer diameter of a protective tube for the sensing unit.

4. Apparatus according to claim 1, characterized in that each heating resistor is supplied with an electrical power of 2-5 watt and that the vertical distance is at least 10 cm.

5. Apparatus according to claim 1, characterized in that the body and the reference junction part in each sensing unit is supported by a rod made of a material being a poor heat conductor and preferably mounted centrally in a protective tube.

6. Apparatus according to claim 5, characterized in that the reference junction part is turbulent in good thermal contact with a second body of a material being a good heat conductor, said second body being in good thermal contact with the interior wall of the tube.

7. Apparatus according to claim 5, characterized in that the tube is filled with a flexible moulding compound which is a poor heat conductor, an electrical insulator and resistive to water and oil.

8. Apparatus according to claim 5, characterized in that the bodies are cylindrical and dimensioned to tightly engage the interior tube wall with a close fit and have apertures or recesses for passing electrical wires through the tube.

9. Apparatus according to claim 8, characterized in that the bodies have the shape of sleeves at the inner wall of which the measuring junction part and the heating resistor and the reference junction part respectively, are mounted.

10. Apparatus according to claim 1, characterized in that the sensing units are evenly distributed along the major portion of the level range of interest, but with a reduced mutual spacing between the sensing units along an end portion at the lower and upper portion respectively, of the level range.

11. Apparatus according to claim 10, characterized in that sensing units are arranged in two tubes extending parallel to each other, but being mutually displaced in the longitudinal direction by a distance equal to the half of said reduced mutual spacing.

12. Apparatus according to claim 1, characterized in that the heating resistor in a number of sensing units being grouped together are supplied in parallel and that one supply conductor is extended directly to and has its first connection to the lowermost sensing unit in the group, whereas the other supply conductor has its first connection to the uppermost sensing unit in the group.

* * * * *